United States Patent
Klinger et al.

(10) Patent No.: US 11,535,293 B2
(45) Date of Patent: Dec. 27, 2022

(54) STEERING SHAFT FOR A STEERING SYSTEM OF A MOTOR VEHICLE, METHOD FOR ASSEMBLING SUCH A STEERING SHAFT, STEERING SYSTEM FOR A MOTOR VEHICLE, AND MOTOR VEHICLE

(71) Applicant: AUDI AG, Ingolstadt (DE)

(72) Inventors: Thomas Klinger, Ingolstadt (DE); Ruben Goldberg, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 123 days.

(21) Appl. No.: 17/041,101

(22) PCT Filed: May 13, 2019

(86) PCT No.: PCT/EP2019/062193
§ 371 (c)(1),
(2) Date: Sep. 24, 2020

(87) PCT Pub. No.: WO2019/233707
PCT Pub. Date: Dec. 12, 2019

(65) Prior Publication Data
US 2021/0101636 A1    Apr. 8, 2021

(30) Foreign Application Priority Data
Jun. 4, 2018  (DE) .................... 10 2018 208 745.8

(51) Int. Cl.
*B62D 1/19* (2006.01)
*B62D 1/20* (2006.01)

(52) U.S. Cl.
CPC ............... *B62D 1/192* (2013.01); *B62D 1/20* (2013.01)

(58) Field of Classification Search
CPC .......... B62D 1/19; B62D 1/192; B62D 1/197; B62D 1/20
See application file for complete search history.

(56) References Cited

U.S. PATENT DOCUMENTS

| | | |
|---|---|---|
| 3,678,777 A | 7/1972 | Olsen |
| 3,988,027 A | 10/1976 | Serizawa et al. |

(Continued)

FOREIGN PATENT DOCUMENTS

| | | |
|---|---|---|
| DE | 2150789 A1 | 5/1972 |
| DE | 102012014762 A1 | 1/2014 |

(Continued)

OTHER PUBLICATIONS

Machine translation of JP-2003182594 A, obtained from espacenet.com on Feb. 24, 2022 (Year: 2022).*

(Continued)

*Primary Examiner* — Karen Beck
(74) *Attorney, Agent, or Firm* — Maier & Maier, PLLC

(57) ABSTRACT

A steering shaft for a steering system of a motor vehicle, having at least two steering shaft elements, via which a steering wheel is mechanically connectable to a steering gear of the steering system, and having at least one joint, via which the steering shaft elements are connected to one another in a torque-transmitting manner and so they are pivotable relative to one another around the pivot axis. At least one securing element, which secures the steering shaft elements relative to one another against pivot movements extending around the pivot axis both in a first pivot direction and also in a second pivot direction opposite to the first pivot direction and releases the steering shaft elements for a pivot movement relative to one another taking place around the pivot axis in at least one of the pivot directions.

10 Claims, 1 Drawing Sheet

(56) References Cited

U.S. PATENT DOCUMENTS

| | | | |
|---|---|---|---|
| 5,853,194 A | | 12/1998 | Baker et al. |
| 2006/0028010 A1* | | 2/2006 | Yamada ................. B62D 1/192 |
| | | | 280/775 |
| 2007/0066409 A1* | | 3/2007 | Sekine ................. F16D 1/0864 |
| | | | 464/179 |
| 2009/0001701 A1* | | 1/2009 | Watanabe ................ F16F 7/12 |
| | | | 280/777 |
| 2009/0026748 A1* | | 1/2009 | Yoshioka ............... B62D 1/192 |
| | | | 188/377 |
| 2009/0058060 A1* | | 3/2009 | Imagaki .................. B62D 1/16 |
| | | | 280/771 |

FOREIGN PATENT DOCUMENTS

| | | | | |
|---|---|---|---|---|
| EP | 0683084 A2 * | 11/1995 | | |
| EP | 2429876 A1 | 3/2012 | | |
| GB | 2268129 A * | 1/1994 | ............ | B62D 1/197 |
| GB | 2344084 A * | 5/2000 | ............ | B62D 1/192 |
| GB | 2482161 A | 1/2012 | | |
| JP | H09-309444 A | 12/1997 | | |
| JP | 2003-182594 A | 7/2003 | | |
| KR | 20130048839 A * | 5/2013 | ............ | B62D 1/192 |
| WO | 99/03716 A1 | 1/1999 | | |

OTHER PUBLICATIONS

International Search Report (with English translation) and Written Opinion (with Machine translation) dated Jul. 29, 2019 in corresponding International Application No. PCT/EP2019/062193; 19 pages.

Notification of Transmittal of Translation of the International Preliminary Report on Patentability dated Dec. 17, 2020, in connection with corresponding international application No. PCT/EP2019/062193 (9 pages).

Examination Report dated Mar. 3, 2022, in connection with corresponding German Application No. 102018208745.8 (15 pp., including machine-generated English translation).

Office Action dated Apr. 15, 2022 in corresponding Chinese Application No. 201980030017.2; 10 pages including English-language translation.

* cited by examiner

STEERING SHAFT FOR A STEERING SYSTEM OF A MOTOR VEHICLE, METHOD FOR ASSEMBLING SUCH A STEERING SHAFT, STEERING SYSTEM FOR A MOTOR VEHICLE, AND MOTOR VEHICLE

FIELD

A steering shaft for a steering system of a motor vehicle, in particular a passenger vehicle, and a method for assembling such a steering shaft.

BACKGROUND

U.S. Pat. No. 5,853,194 discloses an arrangement of steering shafts, which are jointly rotatable to transmit steering torques in a vehicle steering column. Shafts which are connected to one another via a joint are provided for this purpose.

Furthermore, WO 99/03716 A1 discloses a steering column arrangement for motor vehicles having an energy absorption element having a telescopically collapsible steering spindle mounted in jacketed pipe parts.

A steering connection which has two universal joints is known from GB 2482161 A. In addition, a connection is provided, via which a lower region and an upper region of the steering connection are connected to one another. The connection is designed to break in the event of a frontal impact.

In addition, a motor vehicle is known from DE 10 2012 014 762 A1, having an instrument panel and having a steering wheel arranged on the steering column. The steering wheel is movable in relation to the instrument panel and is displaceable from a first position into a second position in a longitudinal direction of the steering column in the direction of the instrument panel.

SUMMARY

The object of the present invention is to provide a steering shaft, a method for assembling such a steering shaft, a steering system, and a motor vehicle, so that particularly advantageous accident behavior can be implemented.

A first aspect of the invention relates to a steering shaft for a steering system of a motor vehicle, in particular a passenger vehicle. The steering shaft comprises at least two steering shaft elements, via which a steering wheel is mechanically connectable to a steering gear of the steering system. The steering shaft additionally has at least one joint, via which the steering shaft elements are connected or coupled to one another in a torque-transmitting manner and so they are pivotable relative to one another around the pivot axis. The steering shaft elements are preferably formed separately from one another and are coupled to one another so they are pivotable relative to one another via the joint and are thus articulated. The above-mentioned pivot axis is defined or predetermined by the joint in this case, for example, in that at least two joint parts of the joint are connected to one another in such a way that the joint parts and, with them, the steering shaft elements can be pivoted relative to one another around the pivot axis. One of the joint parts is, for example, connected in a rotationally-fixed manner to one of the steering shaft elements, wherein the other joint part is connected in a rotationally-fixed manner to the other steering shaft element. In particular, it is conceivable that the one joint part is integrally formed with the one steering shaft element and/or the other joint part is integrally formed with the other steering shaft element. Alternatively thereto, it is conceivable that the respective joint part and the respective associated steering shaft element are formed as components which are formed separately from one another and are connected to one another at least in a rotationally-fixed manner. The joint parts are formed separately from one another and are articulated with one another in this case. The pivot axis is a virtual or imaginary axis, around which the steering shaft elements can in principle be pivoted relative to one another.

The feature that the steering shaft elements are connected to one another in a torque-transmitting manner via the joint is to be understood to mean that torques can be transmitted between the steering shaft elements via the joint. In this way, for example, a torque which is transmitted via the steering wheel to the one steering shaft element can be transmitted from the one steering shaft element via the joint to the other steering shaft element. The torque can finally be transmitted from the other steering shaft element to the steering gear to thus be able to steer, for example, steerable or steered wheels, in particular front wheels, of the motor vehicle. Torques exerted on the steering wheel can thus be transmitted from the steering wheel via the steering shaft and thus via the steering shaft elements to the steering gear. The steering shaft elements are rotatable in this case, for example, around at least one, in particular common rotational axis or around respective rotational axes, in particular simultaneously or jointly. Therefore, for example, if the steering wheel rotates around a steering wheel rotational axis, in particular around a body designed as a self-supporting body of the motor vehicle design, for example, as a passenger vehicle, the steering wheel elements are thus rotated around the rotational axis or around the respective rotational axes, in particular relative to the body. In this case, the steering shaft elements and the steering wheel rotate jointly or simultaneously. As a result, the wheels are pivoted relative to the body and thus steered. Cornering and/or direction changes of the motor vehicle can thus be effectuated, for example. In other words, in its completely produced state, the motor vehicle has the wheels and the steering system, which comprises the steering shaft. The wheels are held rotatably on the body and are pivotable around a respective steering axis relative to the body and are thus steerable. By pivoting or steering the wheels around the pivot axes, lane changes, direction changes, and/or cornering of the motor vehicle can be effectuated. In the completely produced state of the motor vehicle, the steering wheel is mechanically connected to the steering gear via the steering shaft and thus via the steering shaft elements, so that torques exerted on the steering wheel are transmittable or are transmitted from the steering wheel to the steering shaft and from the steering shaft to the steering gear. The above-mentioned torques are exerted, for example, by a person, in particular by the driver of the motor vehicle, on the steering wheel to rotate the steering wheel relative to the body and thus to steer the wheels.

In particular, the steering shaft according to the invention can be designed as a steering intermediate shaft. In this case, the steering system comprises, for example, a steering column, on which, for example, the steering wheel is held rotatably. In particular, the steering wheel can be connected to the steering column in a rotationally-fixed manner. In the completely produced state of the motor vehicle, for example, the steering wheel is mechanically connectable or connected to the steering gear via the steering intermediate shaft, in particular in such a way that the above-mentioned torques exerted on the steering wheel are transmittable or are transmitted from the steering wheel firstly to the steering column, from the steering column to the steering intermediate shaft, and from the steering intermediate shaft to the steering gear.

To be able to implement particularly advantageous accident behavior of the steering shaft and thus of the motor vehicle as a whole in a manner particularly favorable for installation space, it is provided according to the invention that the steering shaft has at least one securing element. The securing element secures the steering shaft elements relative to one another against pivot movements extending around the pivot axis both in a first pivot direction extending around the pivot axis and also in a second pivot direction opposing the first pivot direction and extending around the pivot axis. This means that the joint as such defines or predetermines or forms the pivot axis, so that the steering shaft elements as such, in particular when the securing element is not or is not yet provided or assembled, can be pivoted around the pivot axis relative to one another in the opposing pivot directions, without damage or destruction of the steering shaft elements or the joint occurring. By means of the securing element, however, the steering shaft elements are now secured relative to one another in such a way that both pivoting of the steering shaft elements relative to one another extending around the pivot axis in the first pivot direction and also pivoting of the steering shaft elements relative to one another taking place around the pivot axis in the second pivot direction are suppressed or avoided by means of the securing element. Expressed again in other words, in the completely produced state of the steering shaft, in which the steering shaft elements are connected to one another via a joint in a torque-transmitting manner and so they are pivotable relative to one another around the pivot axis and the securing element is provided, i.e., assembled, the steering shaft elements cannot be pivoted relative to one another around the pivot axis in the pivot directions, without damage or destruction of the securing element occurring.

It is furthermore provided according to the invention in this case that the securing element, as a result of an accident-related application of force, releases the steering shaft elements for a pivot movement taking place around the pivot axis in at least one of the pivot directions and relative to one another. Thus, for example, if an application of force resulting from an accident, in particular a frontal impact, of the motor vehicle and acting on the steering shaft, in particular on the steering shaft elements, is sufficiently high and in particular so high in this case that the application of force exceeds a threshold value, the steering shaft elements are thus pivoted around the pivot axis in at least one of the pivot directions relative to one another such that the securing element is damaged or destroyed and at the same time, for example, at least deformed and/or broken. This means that the securing element, as a result of an accident-related application of force, releases the steering shaft elements with destruction and/or damage of the securing element for pivot movements relative to one another taking place around the pivot axis in at least one of the pivot directions. This means that pivoting of the steering shaft elements relative to one another extending around the pivot axis accompanies destruction and/or damage of the securing element. The above-mentioned threshold value can be set or predetermined by constructive design of the securing element. In other words, the threshold value can be influenced or set by corresponding selection of a geometry of the securing element and/or by corresponding selection of the material from which the securing element is produced. In this way, it is possible to set the accident behavior of the steering shaft as needed in a manner favorable for installation space.

The joint is buckled or flexed by the pivoting of the steering shaft elements relative to one another around the pivot axis, so that pivoting of the steering shaft elements relative to one another taking place around the pivot axis is also referred to as flexing or buckling of the joint. In this case, for example, pivoting of the joint parts and thus of the steering shaft elements relative to one another takes place without damage or destruction of the joint or the joint parts themselves occurring or having to occur. Therefore, the threshold value from which the steering shaft elements are pivoted relative to one another around the pivot axis with destruction or damage of the securing element is also referred to as the buckling or flexing force. The buckling force can be set as needed by corresponding design of a single component in the form of the securing element and thus in a particularly simple manner. In addition, the buckling force can be kept particularly low or set particularly low, so that particularly advantageous accident behavior can be displayed.

In addition, for example, a telescopic length or telescoping of the steering shaft can be kept particularly small, whereby the installation space requirement of the steering shaft can be kept particularly small. In this way, the steering shaft can be assembled particularly easily. Since advantageous flexing or buckling of the joint and thus of the steering shaft in case of an accident can be implemented by the joint and the securing element, the telescoping does not have to be used or only has to be used slightly to implement an advantageous accident behavior, so that, for example, the telescoping only or at least predominantly corresponds to assembly and tolerance compensation functions. The assembly function of the telescoping is to be understood, for example, to mean that the telescoping is used during the assembly of the steering shaft or the steering system to be able to assemble the steering shaft or the steering system easily even with only little available installation space. A tolerance compensation function is to be understood to mean that the telescoping is used to compensate for, for example, manufacturing-related and/or assembly-related tolerances, in particular during operation of the motor vehicle. Since the telescoping is not used or is only used secondarily, for example, to avoid excessive intrusions of the steering gear, in particular into the interior of the motor vehicle, the telescopic length of the telescoping can be kept particularly small. At the same time, excessive intrusions of the steering gear can be avoided, since the securing element enables advantageous flexing as needed of the joint and thus of the steering shaft elements.

The invention is based on the following finding in particular: Conventional steering intermediate shafts as a connection between a steering column and a steering gear typically have telescoping, which is used both for the assembly and also, in the event of an accident, enables decoupling of an accident-related offset of the steering gear to which accident-related loads are applied from the steering column and thus from the steering wheel. This means that the telescoping is conventionally used to avoid excessive intrusions of the steering column and of the steering wheel.

Furthermore, it is conceivable to provide a steering shaft designed, for example, as a steering intermediate shaft with at least one intended buckle point, which is formed, for example, by so-called corrugated pipe. If an accident-related load acting on such a steering shaft exceeds a certain level, the shaft thus buckles at the intended buckle point in a defined manner. Such conventional steering shafts have the following disadvantages: The telescopic length of the telescoping, which is also referred to simply as length, is typically limited due to a geometry, because respective locations of typically provided universal joints are predetermined for reasons of installation space and a residual overlap of telescopic parts of the telescoping has to be reserved for normal operation. The telescopic parts of the telescoping are arranged partially one inside another in a starting state and can be pushed farther one into another starting from the starting state. The telescopic parts can be pushed one inside another, for example, by a distance, wherein this distance is referred to as the above-mentioned telescopic length. Since the telescopic length is limited, a maximum rear offset of the steering gear is also limited. This means that a distance by which the steering gear can be offset to the rear in the vehicle longitudinal direction in the event of an accident-related application of force, without excessive displacement or offset of the steering wheel occurring, is limited. As a result, corresponding vehicle body measures are to be found to avoid or limit excessive crushing in case of an accident. However, these measures can be contradictory to the desire to implement the softest possible cushioning in case of an accident.

The disadvantages of intended buckle points on steering intermediate shafts are that such an intended buckle point only fails at a very high load. In other words, a steering intermediate shaft formed having such an intended buckle point only buckles from a very high load, since this load cannot be embodied to be arbitrarily low, since sufficiently high torques have to be transmitted via the intended buckle point in normal operation without damage or destruction of the steering shaft occurring.

The above-mentioned disadvantages and problems can be avoided by means of the steering shaft according to the invention. The steering shaft according to the invention enables, on the one hand, a particularly advantageous decoupling of the steering gear from the steering column or the steering wheel, so that, for example, in the event of an accident, in particular in the event of a frontal impact, the steering gear can be offset to the rear by a large distance in the vehicle longitudinal direction without excessive displacement or offset of the steering wheel occurring. Simultaneously, undesired body measures can be avoided in this case, so that the body does not have to be designed to be excessively rigid. As a result, particularly high accident-related levels of energy can be accommodated or absorbed by means of the body with deformation of the body. Moreover, for example, an excess telescopic length of possible telescoping of the steering shaft can be kept particularly small, so that the installation space requirement of the steering shaft can be kept particularly small. As a result, the steering shaft can be assembled easily.

Moreover, the steering shaft according to the invention can be assembled easily, for example, in that the steering shaft is assembled in a state in which the steering shaft elements are pivotable relative to one another around the pivot axis and are thus not yet secured relative to one another by the securing element against pivots extending around the pivot axis. After completed assembly of the steering shaft, the securing element is assembled or arranged in such a way that the securing element fixes the joint and thus secures it against flexion around the pivot axis in the pivot directions. In the above-described state, in which the joint can still be flexed, the steering shaft elements can be pivoted relative to one another around the pivot axis for assembly purposes, so that the steering shaft may be buckled or flexed around the pivot axis for assembly purposes. Subsequently thereto, the joint is fixed by means of the securing element and thus formed as a rigid or solidified joint. If an accident-related application of force then occurs, the securing element thus fails, for example, with application of force and/or travel, whereby the securing element releases flexion of the joint.

As a result, the steering shaft can buckle or flex around the pivot axis, for example, if the steering gear is displaced by the accident, so that the steering gear subjected to the accident can no longer transmit force or can only transmit a minor force to the steering column or the steering wheel. Excessive displacement of the steering column and the steering wheel can thus be avoided. Expressed again in other words, according to the invention, the steering shaft can yield to or evade an application of force which is transmitted, for example, in the event of an accident from the steering gear to the steering shaft, in that the securing element fails due to this application of force and releases the flexion of the joint. If the steering gear is displaced further, for example, the steering gear thus causes flexion of the joint, i.e., pivoting of the steering shaft elements relative to one another extending around the pivot axis. In this way, the steering gear can be displaced to the rear in the vehicle longitudinal direction, while excessive displacement of the steering column and the steering wheel in the vehicle longitudinal direction does not occur, however.

To be able to implement particularly advantageous accident behavior, it is provided in an advantageous design of the invention that the securing element is designed as a sleeve formed separately from the steering shaft elements and separately from the joint, which is arranged partially on each of the steering shaft elements and thus extends from one of the steering shaft elements via the joint to the respective other steering shaft element, in particular continuously. The sleeve is thus also arranged on or over the joint. In this way, for example, the above-mentioned buckling force, from which the sleeve fails and the steering shaft elements are pivoted relative to one another around the pivot axis, can be set particularly as needed and also simply and inexpensively.

To implement particularly advantageous accident behavior in a particularly inexpensive manner, it is provided in a further design of the invention that the securing element is integrally formed.

A further embodiment is distinguished in that the securing element is formed from a plastic and/or from a metallic material, in particular from a steel. In this way, the buckling force can be set particularly deliberately and as needed and also in a simple manner.

In one particularly advantageous embodiment of the invention, the steering shaft elements are secured by means of the securing element in a position in which the steering shaft elements extend linearly, i.e., along an imaginary straight line. This means that the steering shaft elements or their respective longitudinal extension directions enclose an angle of 180° or 0°. In other words, the longitudinal extension directions of the steering shaft elements coincide. Expressed again in other words, the one steering shaft element follows in extension of the respective other steering shaft element linearly on the other steering shaft element, so that both steering shaft elements extend along an imaginary straight line. The position is also referred to as a linear position here in which the steering shaft elements are fixed relative to one another by means of the securing element. In the linear position, the joint is not flexed.

Alternatively, it has been shown to be particularly advantageous if the steering shaft elements or their longitudinal extension directions, in the above-mentioned position, in which the steering shaft elements are secured relative to one another by means of the securing element, enclose an angle different from 180° and preferably an obtuse angle at the same time. The steering shaft is cranked in this case and requires a larger installation space in relation to the linear position, in particular in the case of so-called spinning, in the context of which the steering shaft elements are rotated jointly or simultaneously by rotating the steering wheel. However, a buckle direction coinciding with one of the rotational directions, for example, in which the steering shaft elements are pivoted relative to one another in the event of an accident, in particular in the event of a frontal impact, of the motor vehicle with destruction or damage of the securing element, is predetermined or defined. Thus, if the steering shaft elements do not extend linearly, i.e., do not extend along an imaginary straight line, but rather the steering shaft elements enclose an angle different from 180° or 0° in the position, the steering shaft is thus cranked. This means that then the steering shaft has a crank, by which the above-mentioned buckle direction can be set or predetermined in a defined manner.

To be able to implement a length change of the steering shaft in a simple manner favorable for installation space, it is provided in a further design of the invention that at least one steering shaft element has at least two steering shaft parts, which are rotatable around a rotational axis, are coupled to one another in a torque-transmitting manner, in particular are connected to one another in a rotationally-fixed manner, and are can be pushed telescopically one inside the other. In this way, for example, a steering column adjustment can be implemented, in the context of which the steering wheel can be displaced in the longitudinal extension direction of the steering shaft parts, in particular relative to the body.

The steering shaft elements are rotatable, for example, around a common steering shaft part rotational axis, so that the steering shaft parts are in particular rotated jointly or simultaneously around the steering shaft part rotational axis if the steering wheel is rotated relative to the body. The steering shaft part rotational axis coincides, for example, with the longitudinal extension direction of the respective steering shaft part. In particular, it is conceivable that the steering shaft part rotational axis coincides with the rotational axis around which the at least one steering shaft element is rotatable or is rotated, in particular relative to the body, when the steering wheel is rotated relative to the body.

The feature that the steering shaft parts can be pushed telescopically one inside the other is also referred to as telescoping of the steering shaft parts or the at least one steering shaft element. During the telescoping, the steering shaft parts are arranged at least partially one inside the other and can be pushed one inside the other, in particular along the steering shaft part rotational axis. The telescoping can be used in the context of an assembly of the steering shaft to at least temporarily push the steering shaft parts one inside the other by means of the telescoping during the assembly. In this way, a length shortening of the steering shaft can be implemented, so that the steering shaft can be assembled easily. After the assembly or after a preassembly, for example, the steering shaft parts can be pulled apart from one another again or pushed apart from one another again by the telescoping and fixed relative to one another.

Furthermore, the telescoping can be used, for example, to push the steering wheel in the direction of a seating system and to push it away from the seating system, so that the steering wheel can be positioned, for example, as needed in the interior of the motor vehicle. The steering shaft parts can be pushed telescopically or telescoping one inside the other by a telescoping distance also referred to as the telescopic length and then, for example, pulled apart or pushed apart from one another again.

For example, one of the steering shaft parts is connected in a rotationally-fixed manner to one of the above-described joint parts, wherein it is conceivable that the one steering shaft part is integrally formed with the one joint part. In this way, the telescoping of the steering shaft parts can be arranged in the region of the joint or close to the joint. Since a particularly advantageous accident behavior can already be ensured by means of the joint and by means of the securing element, the telescoping of the steering shaft parts does not have to be used or does not primarily have to be used to implement an advantageous accident behavior, so that the telescopic length of the telescoping of the steering shaft parts can be significantly less than is the case with telescoping of conventional steering shafts. In particular, the telescopic length of the steering shaft parts can be kept small, since assembly requirements are not design-relevant. In addition, the telescopic length can be kept particularly small, for example, by way of a rotational axis of the steering column adjustment as close as possible to an upper universal joint and/or by a soft mounting, for example, of the steering gear.

In one particularly advantageous embodiment of the invention, the steering shaft has at least one further steering shaft element, which is connected to the first steering shaft elements via at least one second joint in a rotationally-transmitting manner and so it is pivotable around a second pivot axis relative to the first steering shaft elements. The pivot axes preferably extend in parallel to one another, wherein the pivot axes are spaced apart from one another along a direction extending perpendicularly to the pivot axis. The respective above-mentioned rotational axis extends, for example, perpendicularly to a first plane. The respective pivot axis extends, for example, perpendicularly to a second plane. In this case, for example, the respective pivot axis and the respective rotational axis are arranged relative to one another in such a way that the planes extend perpendicularly to one another.

With respect to the second joint, the first joint is an additional joint, by means of which, in combination with the securing element, particularly advantageous accident behavior and a particularly small installation space requirement of the steering shaft may be implemented. If the steering shaft is fundamentally designed, for example, as a two-joint steering train having two conventional joints, the first joint is thus an additional third joint. If the steering shaft is fundamentally designed, for example, as a three-joint steering train having basically three joints, the first joint is thus an additional fourth joint. The concept of the invention is thus to supplement conventional steering shafts with at least or precisely one further additional joint and prevent flexion of the additional joint by means of the securing element in a normal state. However, if an accident state different from the normal state occurs, in which an accident-related application of force acts on the steering shaft, the securing element thus releases the flexion of the additional joint with destruction or damage of the securing element, so that the steering shaft can yield to or evade the accident-related application of force. Excessive intrusions of the steering shaft can thus be avoided.

A further embodiment is distinguished by at least one shaft element connected in a torque-transmitting manner to the further steering shaft element and provided in addition to the steering shaft elements, wherein the further steering shaft element and the shaft element can be telescopically pushed one inside the other. Thus, for example, a particularly advantageous steering column adjustment can be implemented, in the context of which the steering wheel can be displaced in relation to the above-mentioned seating system.

Finally, it has been shown to be particularly advantageous if at least one application element or multiple application elements is or are provided. By means of the respective application element or by means of the application elements, in the event of an accident-related application of force, the securing element is transferable from a securing state securing the steering shaft elements into a release state releasing the steering shaft elements. This means, for example, that in the event of an accident-related application of force, in particular of the application element, an accident-related force is exerted or transmitted from the application element to the securing element. By means of the force, the securing element is transferred from the securing state into the release state, in particular in that the securing element is moved, in particular displaced, relative to the steering shaft elements, and/or deformed and/or destroyed.

The application element can have at least or precisely one strut, in particular having a pivot bearing, wherein the strut causes a relative movement of the securing element, in particular relative to the steering shaft elements, in the event of an accident-related offset of the steering gear. In this way, the securing element comes out of the securing state into the release state. In the securing state, the securing element is arranged, for example, at least partially on each of both steering shaft elements and on the joint, whereby the steering shaft elements are secured. However, in the release state, the securing element is, for example, no longer arranged on at least one of the steering shaft elements and, for example, no longer on the joint, whereby the securing element releases the steering shaft elements.

A second aspect of the invention relates to a method for assembling a steering shaft according to the invention. In the method, at least one first assembly step is carried out while the steering shaft is in an assembly state, in which the securing of the steering shaft elements relative to one another against pivot movements extending around the pivot axis, which is effectuated or can be effectuated by means of the securing element, does not occur both in the first pivot direction and also in the second pivot direction. In this way, the steering shaft elements can be pivoted relative to one another as needed, whereby the steering shaft can be assembled particularly easily.

After the second assembly step is carried out, the securing element is assembled in such a way, in particular on and/or at the steering shaft elements, that the securing element effectuates the securing of the steering shaft elements relative to one another.

A third aspect of the invention relates to a steering system for a motor vehicle, in particular for a passenger vehicle. The steering system according to the invention comprises a steering wheel, a steering gear, and a steering shaft according to the invention, via which the steering wheel is mechanically connected to the steering gear. Advantages and advantageous designs of the first aspect of the invention are to be considered advantages and advantageous designs of the second aspect of the invention and vice versa.

A fourth aspect of the invention relates to a motor vehicle, which is preferably designed as a passenger vehicle and which has a steering shaft according to the invention and/or a steering system according to the invention.

The invention also includes refinements of the method according to the invention, the steering system according to the invention, and the motor vehicle according to the invention, which have features as have already been described in conjunction with the refinements of the steering shaft according to the invention. For this reason, the corresponding refinements of the steering system according to the invention and of the motor vehicle according to the invention are not described again here.

BRIEF DESCRIPTION OF THE FIGURES

Exemplary embodiments of the invention are described hereinafter. In the figures.

DETAILED DESCRIPTION

The exemplary embodiment explained hereinafter relates to preferred embodiments of the invention. In the exemplary embodiment, the described components of the embodiments each represent individual features of the invention to be considered independently of one another, which each also refine the invention independently of one another and are thus to be considered to be a component of the invention individually or in a combination other than that shown. Furthermore, the described embodiment can also be supplemented by further features of the invention already described.

In the figures, identical reference signs each identify functionally identical elements.

Figure 1:
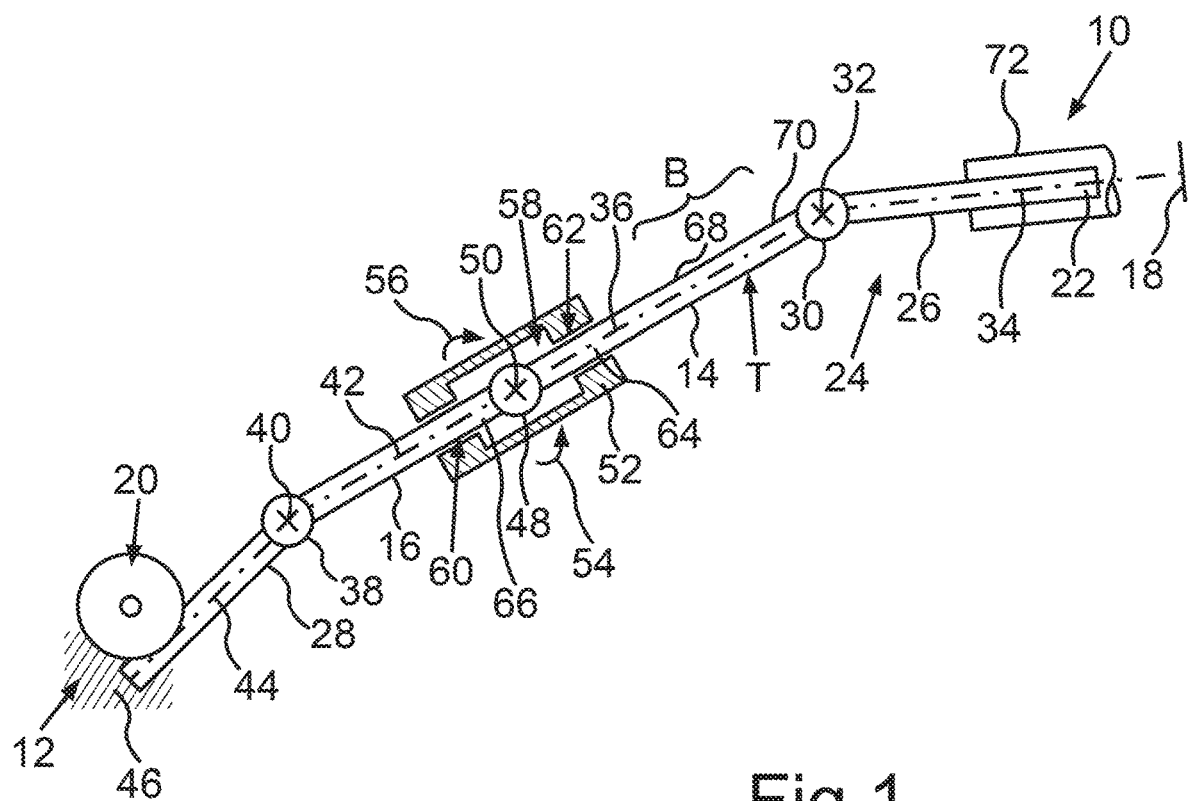
FIG. 1 shows a schematic side view of a steering shaft according to the invention for a motor vehicle in a normal operation and thus during operation of the motor vehicle.

FIG. 1 shows a schematic side view of a steering shaft 10 for a steering system 12 of a motor vehicle, preferably designed as a passenger vehicle. The steering shaft 10 has a first steering shaft element 14 and a second steering shaft element 16, via which a steering wheel 18, which is schematically shown especially in FIG. 1, is mechanically connectable or connected to a steering gear 20 of the steering system 12. In the completely produced state of the motor vehicle, it comprises the steering system 12, which comprises, for example, the steering shaft 10, the steering wheel 18, and the steering gear 20. The motor vehicle additionally has a body designed, for example, as a self-supporting vehicle body and an interior delimited by the body, in which persons, for example, the driver of the motor vehicle, can stay. In addition, the motor vehicle comprises wheels (not shown in the figures) designed, for example, as front wheels, which are designed as steerable or steered wheels. The wheels can therefore be pivoted around respective pivot axes relative to the body and thus steered. By pivoting or steering the wheels relative to the body, for example, lane changes and/or direction changes and/or cornering of the motor vehicle can be effectuated. To pivot the wheels relative to the body, the driver exerts torques on the steering wheel 18. In this way, the steering wheel 18 is rotated around a steering wheel rotational axis 22 relative to the body. By rotating the steering wheel 18, the steering shaft 10 and thus the steering shaft elements 14 and 16 are rotated jointly or simultaneously relative to the body. In addition, the respective torque exerted on the steering wheel 18 is transmitted from the steering wheel 18 to the steering shaft 10 and from the steering shaft 10 to the steering gear 20 and finally from the steering gear 20 to the wheels. The wheels are steered in this way.

The steering system 12 comprises, for example, a steering column 24, to which the steering wheel 18 can be connected, in particular in a rotationally-fixed manner. Moreover, the steering shaft 10 comprises a further, third steering shaft element 26 and a fourth steering shaft element 28. It is apparent from FIG. 1 that the steering shaft element 26 is connected in a torque-transmitting manner to the steering shaft element 14 via a first joint 30 of the steering shaft 10 and so it is pivotable around a first pivot axis 32 relative to the steering shaft element 14. FIG. 1 shows the steering shaft 10 in a normal state in which an accident-related application of force to the steering shaft 10 has not occurred. The steering shaft 10 assumes the normal state, for example, during an operation of the motor vehicle also referred to as normal operation. The steering shaft element 26 is rotatable around the first rotational axis 34 relative to the body, wherein the steering shaft element 14 is rotatable around the second rotational axis 36 relative to the body. Since in the normal state the joint 30 is flexed and not extended, the steering shaft elements 14 and 26 or their respective longitudinal extension directions coinciding with the respective rotational axis 34 or 36, respectively, do not form an imaginary straight line, for example, but rather the steering shaft elements 14 and 26 enclose an angle which is different from 180° or 0° and is preferably obtuse. The longitudinal extension direction of the steering shaft element 14 coincides with the rotational axis 36, wherein the longitudinal extension direction of the steering shaft element 26 coincides with the rotational axis 34. It is apparent from FIG. 1 that because the joint 30 is flexed and not extended, the longitudinal extension directions of the steering shaft elements 14 and 26 or the rotational axes 34 and 36 extend obliquely to one another and thus enclose an angle different from 180° or 0°.

Furthermore, the steering shaft 10 has a second joint 38, via which the steering shaft elements 16 and 28 are connected to one another in a torque-transmitting manner and so they are pivotable relative to one another around a second pivot axis 40. The pivot axes 32 and 40 extend in parallel to one another and are spaced apart from one another, in particular along a direction extending perpendicularly to the pivot axes 32 and 40. The pivot axes 32 and 40 therefore extend perpendicularly to a common first plane. The steering shaft element 16 is rotatable around a rotational axis 42 relative to the body, and the steering shaft element 28, which is associated with the steering gear 20, for example, is rotatable around a rotational axis 44 relative to the body, which is schematically shown particularly in FIG. 1 and is identified by 46. The joint 38 is also flexed and thus not extended, so that the steering shaft elements 16 and 44 or their longitudinal extension directions do not extend along an imaginary straight line, for example, but rather the steering shaft elements 16 and 28 or their longitudinal extension directions enclose an angle different from 180° or from 0°. The longitudinal extension direction of the steering shaft element 16 coincides with the rotational axis 42, wherein the longitudinal extension direction of the steering shaft element 28 coincides with the rotational axis 44. Therefore, the longitudinal extension directions or the rotational axes 42 and 44 do not extend along an imaginary straight line, but rather the longitudinal extension directions or the rotational axes 42 and 44 enclose an angle which is different from 0° or different from 180° and is preferably obtuse. Overall, it is apparent that the rotational axes 34 and 36 extend obliquely to one another and thus do not coincide, and also the rotational axes 42 and 44 extend obliquely to one another and do not coincide.

For example, the steering wheel rotational axis 22 also extends obliquely to the rotational axis 34. The steering wheel rotational axis 22 and the respective rotational axis 34, 36, 42, or 44, respectively, each extend perpendicularly to a respective second plane, which extends perpendicularly to the first plane in each case. If the steering wheel 18 is now rotated, for example, by the driver of the motor vehicle around the steering wheel rotational axis 22 relative to the body, the steering shaft elements 14, 16, 26, and 28 are thus rotated jointly or simultaneously around the respective rotational axes 34, 36, 42, and 44 relative to the body. As a result, the wheels are pivoted relative to the body and thus steered.

To now be able to implement particularly advantageous accident behavior of the steering shaft 10 and thus of the motor vehicle as a whole in a manner particularly favorable for installation space, the steering shaft 10 has a third joint 48 provided in addition to the joints 30 and 38. The steering shaft elements 14 and 16 are connected to one another in a torque-transmitting manner and so they are pivotable relative to one another around a third pivot axis 50 via the joint 48, wherein the pivot axis 50 extends in parallel to the pivot axes 32 and 40 and thus perpendicular to the first plane. With respect to a torque flow extending from the steering wheel 18 to the steering gear 20, the joint 48 is arranged between the joints 30 and 38. A securing element 52 is associated with the joint 48, which secures the steering shaft elements 14 and 16 relative to one another against pivot movements extending around the pivot axis 50 both in a first pivot direction illustrated by a narrow 54 and also in a second pivot direction opposite to the first pivot direction and illustrated in FIG. 1 by an arrow 56. This means that flexion of the joint 48 is suppressed or avoided by the securing element 52. Expressed in other words, the joint 48 is secured by means of the securing element 52 against a flexion of the joint 48, so that in the normal state the steering shaft elements 14 and 16 cannot be pivoted relative to one another around the pivot axis 50, without destruction or damage of the securing element 52 occurring.

As a result of an accident-related application of force, which acts, for example, from the steering gear 20 on the steering shaft 10 and in this case in particular on the steering shaft elements 14 and 16, the securing element 52, with destruction or damage of the securing element 52, releases the steering shaft elements 14 and 16 for a pivot movement relative to one another taking place around the pivot axis 50 in at least one of the pivot directions.

In the exemplary embodiment illustrated in the figures, the securing element 52 is designed as a sleeve formed separately from the steering shaft elements 14, 16, 26, and 28 and separately from the joints 30, 38, and 48, which is arranged at least partially on each of the steering shaft elements 14 and 16 and thus extends continuously from the steering shaft element 14 via the joint 48 to the steering shaft element 16 or inversely, respectively. The securing element 52, which at least partially, in particular at least predominantly or completely, encloses, for example, respective length regions of the steering shaft elements 14 and 16 and the joint 48 in the circumferential direction of the respective steering shaft element 14 and 16, interacts, for example, with the steering shaft elements 14 and 16, in particular in a formfitting manner, in such a way that the steering shaft elements 14 and 16 cannot be pivoted relative to one another around the pivot axis 50 without damaging or destroying the securing element 52, i.e., the joint 48 cannot be flexed without destroying or damaging the securing element 52, in particular starting from a position of the steering shaft elements 14 and 16 relative to one another.

The securing element 52 is integrally formed, for example. Furthermore, it is conceivable that the securing element 52 is formed from a plastic and/or a metallic material.

In the exemplary embodiment illustrated in the figures, the above-mentioned position, in which the steering shaft elements 14 and 16 are secured relative to one another by means of the securing element 52, is a so-called linear position, in which the joint 48 is extended. In this way, the steering shaft elements 14 and 16 extend along an imaginary straight line coinciding with the rotational axes 36 and 42. In other words, in the exemplary embodiment illustrated in the figures, the steering shaft elements 14 and 16 are secured by means of the securing element 52 in such a way that the longitudinal extension directions of the steering shaft elements 14 and 16 and thus the rotational axes 36 and 42 coincide.

Alternatively, it is conceivable that the joint 48 is flexed in the above-mentioned position, so that the longitudinal extension directions of the steering shaft elements 14 and 16 or the rotational axes 36 and 42 extend obliquely to one another in the position in which the steering shaft elements 14 and 16 are secured relative to one another by means of the securing element 52 and thus enclose an angle which is different from 180° or 0° and is preferably obtuse.

It is apparent from FIG. 1 that the securing element 52 has a receptacle space 58, in which the joint 48 is accommodated. In addition, the securing element 52 has passage openings 60 and 62, which each open into the receptacle space 58. In this case, the steering shaft element 14 penetrates the passage opening 62 and the steering shaft element 16 penetrates the passage opening 60.

The joint 48 comprises, for example, a first joint part 64 associated with the steering shaft element 14 and a second joint part 66 associated with the steering shaft element 16. The joint part 64 is, for example, connected in a rotationally-fixed manner to the steering shaft element 14. In particular, the joint part 64 can be integrally formed with the steering shaft element 14. The joint part 66 is, for example, connected in a rotationally-fixed manner to the steering shaft element 16, wherein the joint part 66 can be integrally formed with the steering shaft element 16. The joint parts 64 and 66 are formed separately from one another and are articulated with one another such that the joint parts 64 and 66 and thus the joint 48 defines or predetermines or forms the pivot axis 50.

If an accident-related application of force resulting, for example, from a frontal impact of the motor vehicle occurs, which acts via the steering gear 20 on the steering shaft 10 and in this case in particular on the steering shaft elements 14 and 16, and if this accident-related application of force exceeds a level, which is predeterminable or settable, for example, by constructive design of the securing element 52 and is also referred to as a threshold value, the steering shaft elements 14 and 16 are thus pivoted relative to one another around the pivot axis 50 in at least one of the pivot directions with destruction or damage of the securing element 52 due to the accident-related application of force. This means that the joint 48 is flexed starting from the position, so that the steering shaft 10 is flexed or buckled starting from the position. It is apparent from FIG. 2 that the securing element 52 is deformed, in particular bent, by the accident-related application of force or by the pivoting of the steering shaft elements 14 and 16 relative to one another caused by the accident-related application of force. As a result, the steering gear 20 can be displaced or offset to the rear due to the accident in the vehicle longitudinal direction, without excessive displacement of the steering wheel 18 or the steering column 24 occurring. The accident-related displacement of the steering gear 20 can thus be at least substantially decoupled from an accident-related displacement of the steering wheel 18. It has furthermore been shown to be particularly advantageous if, for example, the steering shaft element 14 has, for example, a telescoping T (not shown in greater detail) in a region B. The telescoping T comprises in this case two steering shaft parts 68 and 70 of the steering shaft element 14, which are rotatable jointly or simultaneously around the rotational axis 36, are coupled to one another in a torque-transmitting manner and in this case are connected to one another in a rotationally-fixed manner, for example, and can be pushed one inside the other telescopically. The steering shaft elements 68 and 70 can be pushed one inside another and pulled apart from one another along the rotational axis 36. In this case, for example, the steering shaft part 68 is connected in a rotationally-fixed manner to the joint part 64, wherein the steering shaft part 68 can be integrally formed with the joint part 64. The steering shaft part 70 is, for example, connected in a rotationally-fixed manner to a joint part of the joint 30, wherein the steering shaft part 70 can be integrally formed with the joint part of the joint 30. In the case of the telescoping T, the steering shaft parts 68 and 70 can be pushed one inside the other by a distance also referred to as the telescopic length, wherein the telescopic length can be kept particularly small. For example, a steering column adjustment can be implemented by the telescoping T.

Furthermore, it is conceivable that the steering shaft 10 has at least one shaft element 72, which is connected in a torque-transmitting manner to the steering shaft element 26 and is provided in addition to the steering shaft elements 14, 16, 26, and 28, wherein, for example, the steering shaft element 26 and the shaft element 72 can be pushed one inside another telescopically or in a telescoping manner, in particular along the rotational axis 34. In this way, for example, a particularly advantageous steering column adjustment can be implemented, in the context of which the steering wheel 18 can be displaced in relation to a seating system, for example, a driver seat. The steering wheel 18 can thus, for example, be moved toward the driver seat and away from the driver seat, so that the steering wheel 18 can be positioned as needed in the interior.

Figure 2:
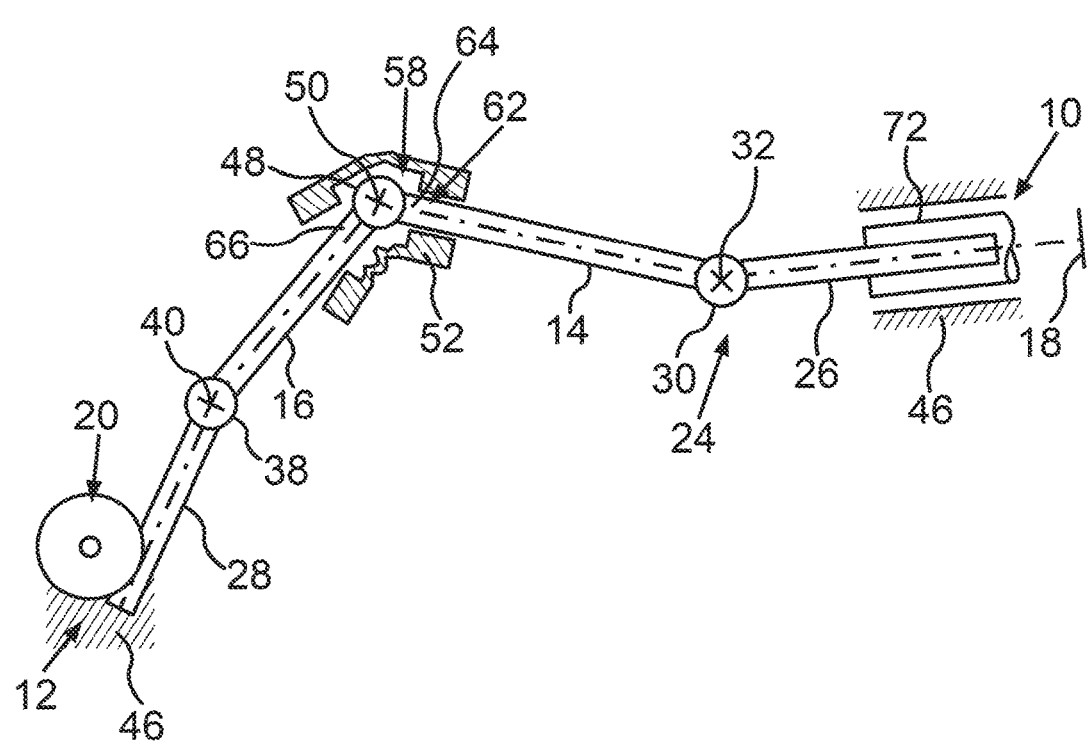
FIG. 2 shows a schematic side view of the steering shaft in an accident state.

It is apparent from FIG. 2 that, for example, the steering shaft element 26 and the shaft element 72 are rotatably mounted on the body 46 around the rotational axis 34. In particular, it is conceivable that the steering wheel rotational axis 22 coincides with the rotational axis 34.

In addition, it is apparent from FIG. 2 that the steering shaft 10 also buckles at the joint 30, for example, in the event of the accident-related application of force, so that the steering gear 20 can be displaced to the rear by a particularly large distance in the vehicle longitudinal direction, without excessive displacement of the steering wheel 18 occurring. In this way, advantageous accident behavior can be implemented in a manner favorable for installation space.

The joint 48 can furthermore be used to implement simple assembly of the steering shaft 10. The steering shaft 10 is assembled, for example, in a state in which the steering shaft elements 14 and 16 are not yet secured relative to one another around the pivot axis 50 by means of the securing element 52, but rather can still be pivoted relative to one another around the pivot axis 50. After completed assembly of the steering shaft 10, the securing element 52 is assembled, in particular in such a way that the securing element 52 secures the steering shaft elements 14 and 16 relative to one another against pivot movements extending around the pivot axis 50 in both pivot directions. Due to the use of the joint 48 and the securing element 52, on the one hand, particularly high torques can be transmitted between the steering shaft elements 14 and 16. On the other hand, the securing element 52 can be designed in such a way that the above-described threshold value is particularly low, so that the steering shaft elements 14 and 16 can be pivoted relative to one another around the pivot axis 50 in at least one of the pivot directions with destruction or damage of the securing element 52 already with a sufficiently small application of force.

The invention claimed is:

1. A steering shaft for a steering system of a motor vehicle, comprising:
   at least two steering shaft elements, via which a steering wheel is mechanically connectable to a steering gear of the steering system, and at least one joint, via which the steering shaft elements are connected to one another in a torque-transmitting manner and so they are pivotable relative to one another around a pivot axis,
   wherein at least one securing element, which secures the steering shaft elements relative to one another against pivot movements extending around the pivot axis both in a first pivot direction and a second pivot direction opposite to the first pivot direction and releases the steering shaft elements for a pivot movement relative to one another taking place around the pivot axis in at least one of the pivot directions, the at least one securing element comprising at least two sides separated by a middle portion, wherein the middle portion is thinner than the two sides.

2. The steering shaft as claimed in claim 1, wherein the securing element is designed as a sleeve formed separately from the steering shaft elements and separately from the joint, which is arranged partially on each of the steering shaft elements and thus extends continuously from one of the steering shaft elements via the joint to the respective other steering shaft element.

3. The steering shaft as claimed in claim 1, wherein the securing element is integrally formed.

4. The steering shaft as claimed in claim 1, wherein the securing element is formed from a plastic and/or from a metallic material.

5. The steering shaft as claimed in claim 1, wherein the steering shaft elements are secured by the securing element in a position in which the steering shaft elements extend linearly or enclose an angle different from 180°.

6. The steering shaft as claimed in claim 1, wherein at least one of the steering shaft elements has two steering shaft parts, which are rotatable around a rotational axis, are coupled to one another in a torque-transmitting manner, and can be pushed one inside the other telescopically.

7. The steering shaft as claimed in claim 1, wherein at least one further steering shaft element, which is connected to the steering shaft via at least one second joint in a torque-transmitting manner and so it is pivotable around a second pivot axis relative to the steering shaft.

8. The steering shaft as claimed in claim 7, wherein at least one shaft element connected in a torque-transmitting manner to the further steering shaft element and provided in addition to the steering shaft elements, wherein the further steering shaft element and the shaft element can be pushed telescopically one inside the other.

9. The steering shaft as claimed in claim 1, wherein at least one application element, by which, in the event of an accident-related application of force, the securing element is transferable from a securing state securing the steering shaft elements into a release state releasing the steering shaft elements.

10. A method for assembling a steering shaft, comprising:
    carrying out at least one first assembly step, during which the steering shaft is in an assembly state in which the securing effectuated by a securing element of the steering shaft relative to one another against pivot movements extending around a pivot axis both in a first pivot direction and also in a second pivot direction does not occur; and
    assembling the securing element in such a way that the securing element effectuates the securing of the steering shaft elements relative to one another.

\* \* \* \* \*